June 6, 1967    SY R. ROBINS    3,323,253
HYDROPONIC UNIT
Filed Oct. 21, 1965
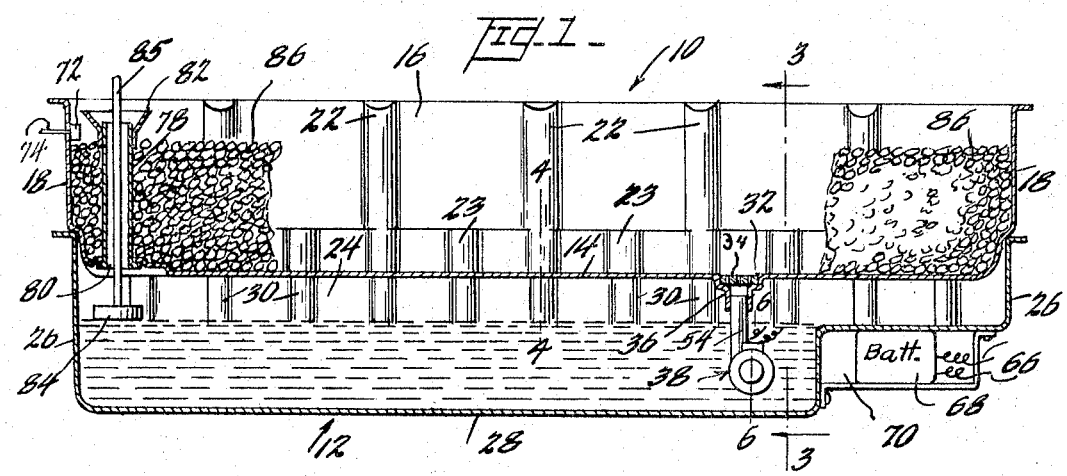
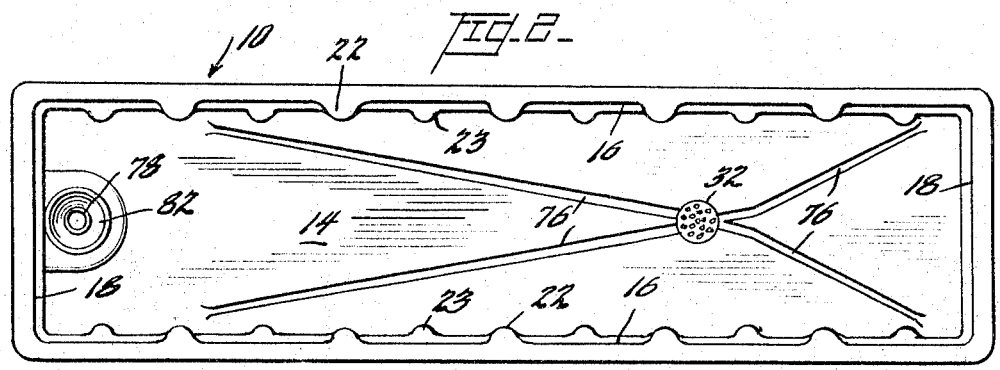
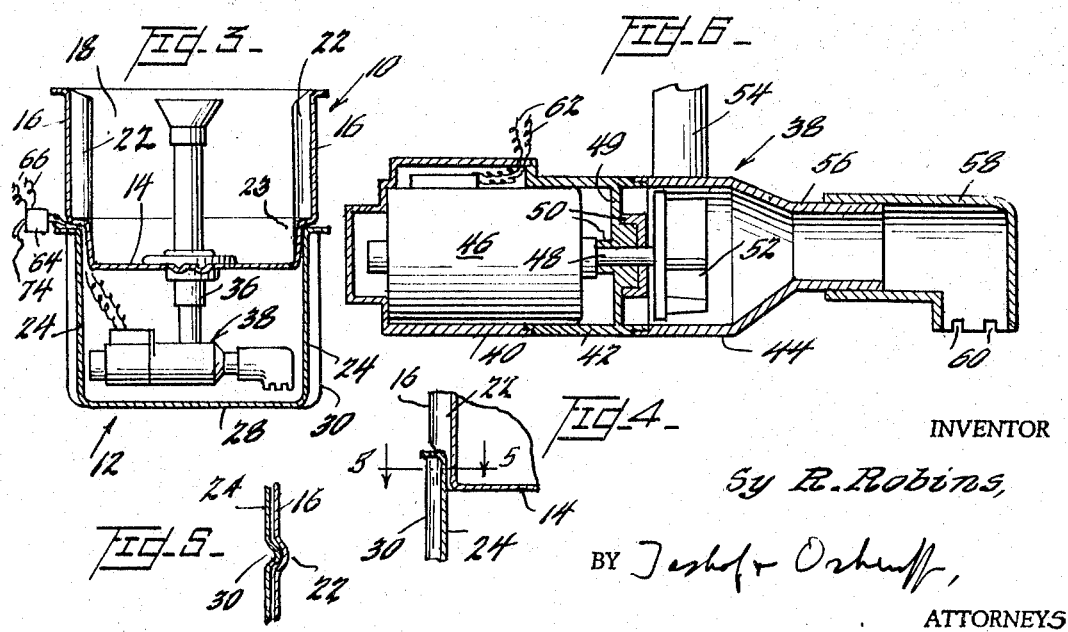
INVENTOR
Sy R. Robins,
BY *[signature]*
ATTORNEYS 3,323,253
HYDROPONIC UNIT
Sy R. Robins, 35 E. 85th St., New York, N.Y. 10028
Filed Oct. 21, 1965, Ser. No. 499,680
8 Claims. (Cl. 47—1.2)

This application is a continuation-in-part of U.S. application Ser. No. 294,438, filed July 11, 1963, now abandoned.

This invention is directed to a hydroponic unit, and more particularly to a portable or movable hydroponic unit.

Hydroponic devices for growing vegetables, fruits, plants, amoebi, algae and other horticultural products are well known. Most desirably, such units contain a growing chamber containing aggregate in which the horticultural product is grown, and periodically there is introduced into this chamber a nutrient liquid which supplies the nourishment for the product. Preferably, the nutrient solution is periodically introduced into the growing chamber in an amount sufficient to wet the aggregate, and then the nutrient solution is drained out of the growing chamber. It has been suggested that the nutrient solution be introduced at the top of the aggregate and from the bottom of the aggregate. In order to minimize disease and the disturbance of the growing product, it is preferable to introduce the nutrient solution at the bottom of the growing chamber, and it is this type of unit to which the present invention is directed.

Introduction of the nutrient solution at the bottom of the growing chamber has been disclosed in U.S. Patents Nos. 2,241,699 and 2,983,076. In each of these patents the growing chamber is superposed over a reservoir for the nutrient solution, and periodically the nutrient solution is pumped upwardly from the reservoir into the growing chamber. Both of these patents effect the movement of the solution into the growing chamber by increasing the pressure in the reservoir to force the solution upwardly through one or more conduits into the growing chamber. This concept of these prior patents necessitates the providing of a substantially hermetic seal (except through the conduits) in order to enable the elevation of the pressure in the reservoir. This results in a structure which is relatively expensive to manufacture and to operate, and produces other shortcomings which are avoided by the present invention.

According to one aspect of the present invention there is provided a hydroponic unit comprising a growing chamber having a bottom, said chamber being adapted to contain an aggregate for supporting a crop, a reservoir for nutrient solution positioned below said chamber, said reservoir being in open communication with the atmosphere, a drain opening in said bottom, a conduit connecting said opening with said reservoir for conducting the nutrient solution from said reservoir into said chamber at the bottom thereof and for draining said nutrient solution from said chamber to said reservoir, a pump interconnected with said conduit for pumping said nutrient solution from said reservoir into said chamber through said drain opening and for returning said solution to said reservoir from said chamber.

According to the preferred construction of the present invention the pump pumps the nutrient solution from the reservoir into the growing chamber when the pump is activated, and it permits the return of the nutrient solution from the chamber into the reservoir by the force of gravity when the pump is inactivated. Most preferably, the growing chamber and the reservoir are constituted by two separate containers, one superposed over the other and nested therein.

Because of the structure of the present invention it is possible to provide the growing chamber with overflow means for returning nutrient solution from the growing chamber to the reservoir when the pump introduces the solution into the nutrient chamber above a predetermined level, such overflow means being effective even during the pumping cycle of the pump. Because of the hermetic seal necessitated by the prior patents referred to above, such an overflow device is not possible.

These and other aspects of the present invention will be readily apparent from the following description of an exemplary embodiment with reference to the accompanying drawings, wherein:

FIG. 1 is a vertical cross section along the longitudinal axis of a hydroponic unit according to the present invention;

FIG. 2 is a top elevation of said unit;

FIG. 3 is a vertical transverse cross section taken along the line 3—3 of FIG. 1;

FIG. 4 is a fragmentary cross section along the lines 4—4 of FIG. 1;

FIG. 5 is a fragmentary cross section along the line 5—5 of FIG. 4; and,

FIG. 6 is a fragmentary cross section along the line 6—6 of FIG. 1, showing in more detail a pump which may be used in the present invention.

Referring to FIGS. 1, 2 and 3, there is provided on upper container 10 which defines a growing chamber adapted to contain the aggregate. Container 10 is superposed over a bottom container 12 which defines the reservoir for the nutrient solution. Container 10 is composed of a bottom 14, vertical side walls 16, and vertical end walls 18, said container being open at the top. The end and side walls 16 and 18 are offset inwardly near the bottom of container 10, so that the bottom portion of container 10 has a smaller periphery than the upper portion, and in this manner container 10 is easily nested within the bottom container or reservoir 12.

Both containers can be made of my desirable material such as metal or plastic, it being only necessary that the containers be watertight, and not toxic to the product being grown. In order to permit the container walls to be made as thin as possible, and yet be sufficiently rigid, the side walls 16 are preferably corrugated or provided with vertical flutes 22 and 23, flutes 22 running the full height of container 10, and flutes 23, positioned between flutes 22, being only in the lower, smaller portion of container 10. These flutes are particularly desirable when the containers are molded from plastic. Particularly desirable material for molding these containers is high impact polystyrene.

The bottom container or reservoir comprises side walls 24, end walls 26, and bottom wall 28. Container 12 is made of the same material as is container 10, and for the same reason is provided with corrugations or vertical flutes 30, said flutes being in line with the flutes 22 and 23 of the top container 10 to further assist in the nesting of the two containers and preventing relative movement between the two containers. It is emphasized at this point that although the two containers are nested so that, in effect, container 10 forms a closure for container 12, the two containers fit together so that there are spaces between the nested walls, thereby maintaining the reservoir in open communication with the atmosphere at all times.

Chamber 10 is provided with a drain opening 32 at the bottom thereof, and in this opening there is provided a perforated disc 34 or closure which permits the free flow of nutrient solution through opening 32 but prevents the aggregate from falling through the opening from the growing chamber into the reservoir. This perforated disc also acts as a diffuser when nutrient is pumped from the reservoir into the growing chamber, thereby preventing the inflowing liquid from disturbing the aggregate or the growing products.

Fitted on the bottom 14 around opening 32 is a downwardly depending nipple 36 on which is mounted an electrically powered centrifugal pump 38. Referring particularly to FIG. 6, the pump 38 comprises a housing formed of three interfitting hollow housing sections 40, 42 and 44. Housing sections 40 and 42 house an electric motor 46 which has a shaft 48 extending through partition 49 in housing section 42. Housing sections 40 and 42 are secured to each other to prevent water from entering the space they define. To further prevent water from reaching the electric motor there are provided bushings or seals 50 around the motor shaft. In the forward housing section 44 there is located an impeller 52 which is mounted on motor shaft 48.

Housing section 44 includes an outlet tube 54 and tapers at its forward end to form inlet tube 56. Mounted on inlet tube 56 is an inlet elbow 58 which has at its open end notches or cut-outs 60, so that if inadvertently the open end of the elbow 58 touches the bottom 28 of the reservoir, the nutrient solution can still enter the elbow through the cut-outs 60.

It will be appreciated from the preceding description that elbow 58, housing 44 including inlet 56 and outlet tube 54, and nipple 36 define a conduit whereby nutrient solution can flow from the reservoir into chamber 10 and vice versa. The electric motor is connected by wires 62 which pass out of the housing of the pump and between the nested walls of chamber 10 and reservoir 12 to a switch 64 on the exterior of the assembly. Switch 64 is in turn connected by wires 66 to a battery 68 which is housed in a recess or space 70 in the bottom portion of reservoir 12, but outside of the reservoir itself so that it is not immersed in the nutrient solution. There may also be provided a float switch or liquid level sensing device 72 in the interior of chamber 10 near the top which is operatively connected by wires 74 to switch 64. The operation of 64 and 72 will be described hereinafter. Obviously, instead of connecting wires 62 to battery 68, the wires can be connected to any other convenient source (not shown) of electricity.

According to the preferred construction, the upper edges and the respective bottoms of each of chambers 10 and reservoir 12 are horizontal. Nevertheless, in order to provide means for collecting as much as possible of the nutrient liquid in chamber 10 when said liquid is being returned to the reservoir, there are provided in the bottom 14 of chamber 10 a plurality of grooves or channels 76 which start at the corners of the chamber and extend inwardly to the opening 32 with the depth and width of the channels 76 increasing as the channels extend toward opening 32, so as to form a sort of sump at opening 32.

An overflow device or conduit is provided for returning to the reservoir the nutrient solution from growing chamber 10 when the level of the liquid rises above a predetermined level, and in the illustrated embodiment this overflow device comprises a vertical tube 78 mounted in chamber 10 near one end thereof about an opening 80 in the bottom 14. About the upper end of tube 78 there is slidably mounted an outwardly flaring or funnel-shaped member 82. By sliding the funnel-shaped member upwardly or downwardly along tube 78 the user of the device can adjust the level at which he wishes the overflow to commence.

There is also provided a float 84 which has mounted thereon an upwardly extending indicator rod, said float being positioned in the reservoir beneath opening 80, with the indicator rod 85 passing through the tube 78. The height of the indicator rod relative to the funnel indicates the level of the nutrient solution, and of course the indicator rod can bear appropriate indicia for indicating this level.

When the hydroponic unit of the present invention is being used, aggregate 86 is placed in the growing chamber 10 and nutrient solution is placed in the reservoir 12 either through funnel 82 or by raising chamber 10 above chamber 12. The aggregate or growing media may be any conventional aggregate used in the art, and may, for example, be gravel or natural stone, fine, coarse, or mixed sand, exfoliated vermiculite or perlite, cinders, crushed rock, pumice, sawdust, moss or any mixture thereof. By way of specific example, the aggregate consists of exfoliated vermiculite having spread thereover a thin layer of gravel. The gravel is used because the vermiculite has a tendency to float until it is saturated, and the weight of the gravel counteracts this temporary effect. The seeds, cuttings, or other growing material are placed in the aggregate in the conventional manner. The nutrient solution is again conventional.

Referring to switch 64, this has been indicated in the drawing merely by a box, since the structure and operation of such switches are well known, and form no part of the invention. The switch, for example, may be a simple "on-off" switch, which is switched to the "on" position when it is desired to pump nutrient solution into the growing chamber, and which is switched manually to the "off" position when the nutrient solution reaches the desirable level, namely, just to the top surface or very slightly above the top surface of the aggregate. On the other hand, the switch 64 may be the "timing" switch which is turned on manually, and automatically remains on the "on" position for a preset period of time, this period being sufficient to raise the nutrient solution to the desired level in the growing chamber. Still further, alternatively, the switch may be a time switch which goes on automatically at preset intervals, and then goes to the "off" position according to a preset cycle.

Referring to 72, this has also been shown in the drawing by a box, since the structure of such mechanism is also well known in the art. 72 may be a mechanism which senses the liquid in the growing chamber when the nutrient solution reaches a predetermined level, and the sensing mechanism at this point switches 64 to the "off" position, switch 64 having been previously turned on either manually or automatically by the timing mechanism therein.

After the nutrient solution has been pumped to the desired level in the growing chamber, the pump is rendered inactive by the operation of switch 64. The free nutrient solution in the growing chamber which does not adhere to the aggregate or the growth in the chamber then flows by gravity out from the growing chamber through the conduit defined by nipple 36, housing 44 and elbow 58. In this manner only sufficient nutrient solution is applied to the crop to adequately nourish the crop without drowning, water-logging, or overfeeding the crop.

In the event, inadvertently, the pump continues operation after the nutrient solution has been raised to the desired level in the growing chamber, the excess nutrient solution will flow into the overflow tube and back to the reservoir. In a similar manner, in the event the device is exposed to rainfall, if there is excess rainfall, the excess can flow out of the growing chamber through the overflow tube.

In the illustrated embodiment, the pump is a submersible pump, and can therefore be located in the reservoir and actually immersed in the nutrient solution. Utilization of the pump permits introduction of the nutrient solution into the growing chamber in a relatively short period of time, that is, in less than a few minutes, without disturbing the contents of the growing chamber, since the solution entered the growing chamber from the bottom of the aggregate through the diffuser 34.

It will be appreciated that since the growing chamber 10 is, in the illustrated embodiment, a separate container, the growing chamber can be removed from the reservoir without disturbing the growth in the growing chamber. Access to the reservoir is desired to permit cleaning the reservoir, changing the nutrient solution, etc. If it is desired to merely add nutrient solution to the reservoir or to take samples of the nutrient solution from the reservoir for testing, this can be readily done through the overflow tube 78.

Although not shown in the illustrated embodiment, the assembled containers 10 and 12 may be housed in an outer housing which may be decorative if so desired, and the use of such a housing facilitates movement of the unit as a whole. There may also be mounted on this outer housing, if desired, appropriate illumination, for providing the illumination needed by the growing plants.

I claim:

1. A hydroponic unit comprising a growing chamber having a bottom, said chamber being adapted to contain an aggregate for supporting a crop, a reservoir for nutrient solution positioned below said chamber, said reservoir being in open communication with the atmosphere at all times, a drain opening in said bottom, a conduit connecting said opening with said reservoir for conducting the nutrient solution from said reservoir into said chamber at the bottom thereof and for draining said nutrient solution from said chamber to said reservoir, a pump connected to said conduit for pumping said nutrient solution from said reservoir into said chamber through said drain opening and for returning said solution to said reservoir from said chamber.

2. A hydroponic unit according to claim 1, wherein said pump is a centrifugal pump mounted below said bottom and so located with respect to said conduit that said pump pumps said nutrient fluid into said chamber when said pump is pumping and permits said solution to return to said reservoir by the force of gravity when said pump is not pumping.

3. A hydroponic unit according to claim 2, wherein said chamber and said reservoir are each constituted by a separate container, the container defining said chamber being positioned over and nested in said contained defining said reservoir.

4. A hydroponic unit according to claim 3, including overflow means for returning said solution from said chamber to said reservoir when the level of said solution in said chamber extends above a predetermined level.

5. A hydroponic unit according to claim 4, wherein said overflow means comprises a vertical tube mounted in said chamber and in communication with said reservoir through said bottom of said chamber.

6. A hydroponic unit according to claim 5, wherein said pump is a submersible pump in location in said reservoir.

7. A hydroponic unit according to claim 6, wherein said bottom of said chamber includes means for directing the nutrient solution therein to said drain opening.

8. A hydroponic unit according to claim 7, including timing switch means mounted on said unit for operating said pump.

References Cited

UNITED STATES PATENTS

| | | | |
|---|---|---|---|
| 2,241,699 | 5/1941 | Cooper | 47—1.2 |
| 2,249,197 | 7/1941 | Brundin | 47—1.2 |
| 2,486,512 | 11/1949 | Armstrong | 47—1.2 |
| 2,674,828 | 4/1954 | Tegner | 37—1.2 |
| 2,983,076 | 5/1961 | Merrill | 47—1.2 |

ABRAHAM G. STONE, *Primary Examiner.*

ROBERT E. BAGWILL, *Examiner.*